No. 823,722. PATENTED JUNE 19, 1906.
F. M. GARRY.
FENCE POST.
APPLICATION FILED APR. 4, 1905.
2 SHEETS—SHEET 1.
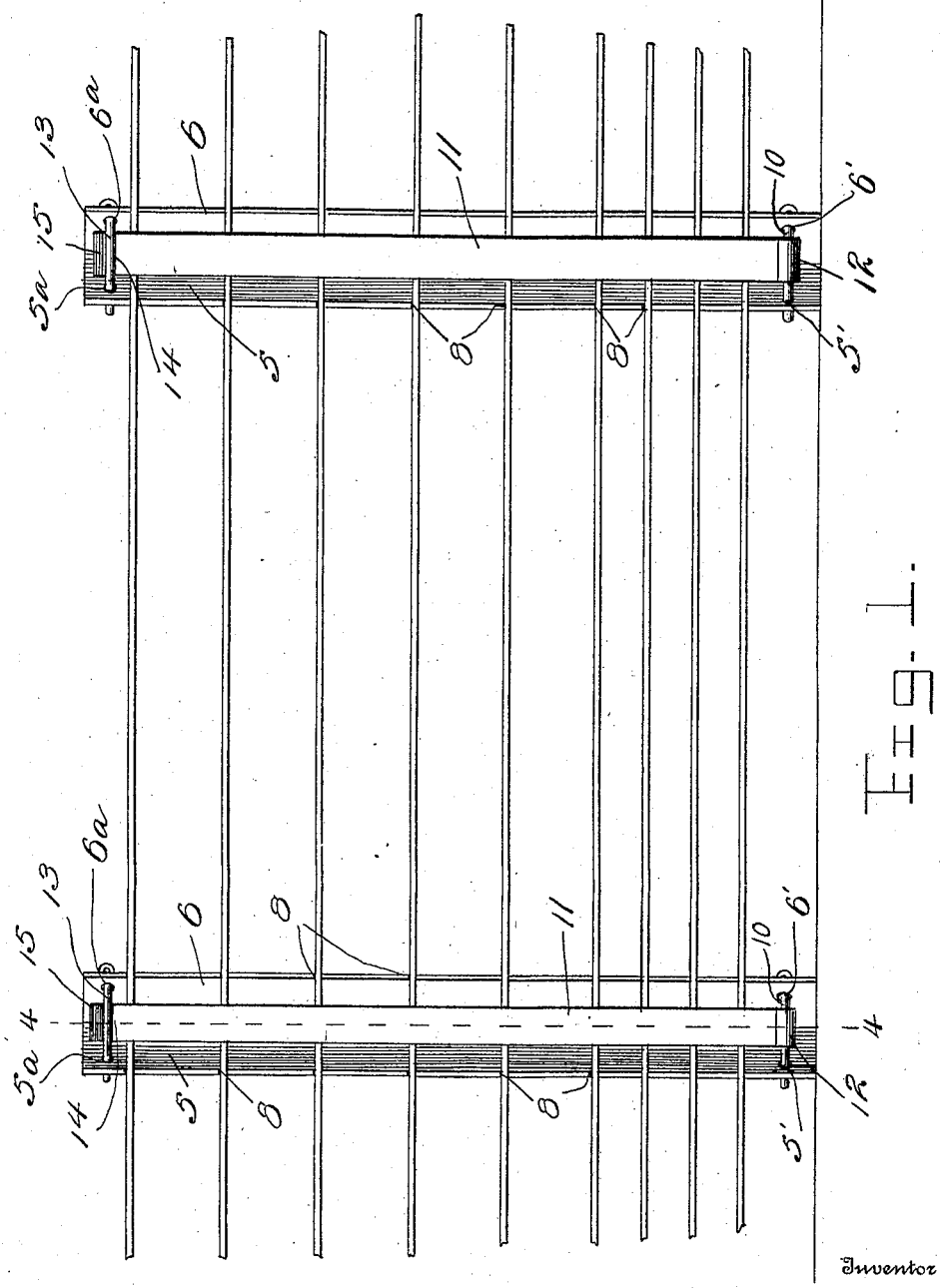
Witnesses
Inventor
F. M. Garry
By Chandler & Chandler
Attorneys

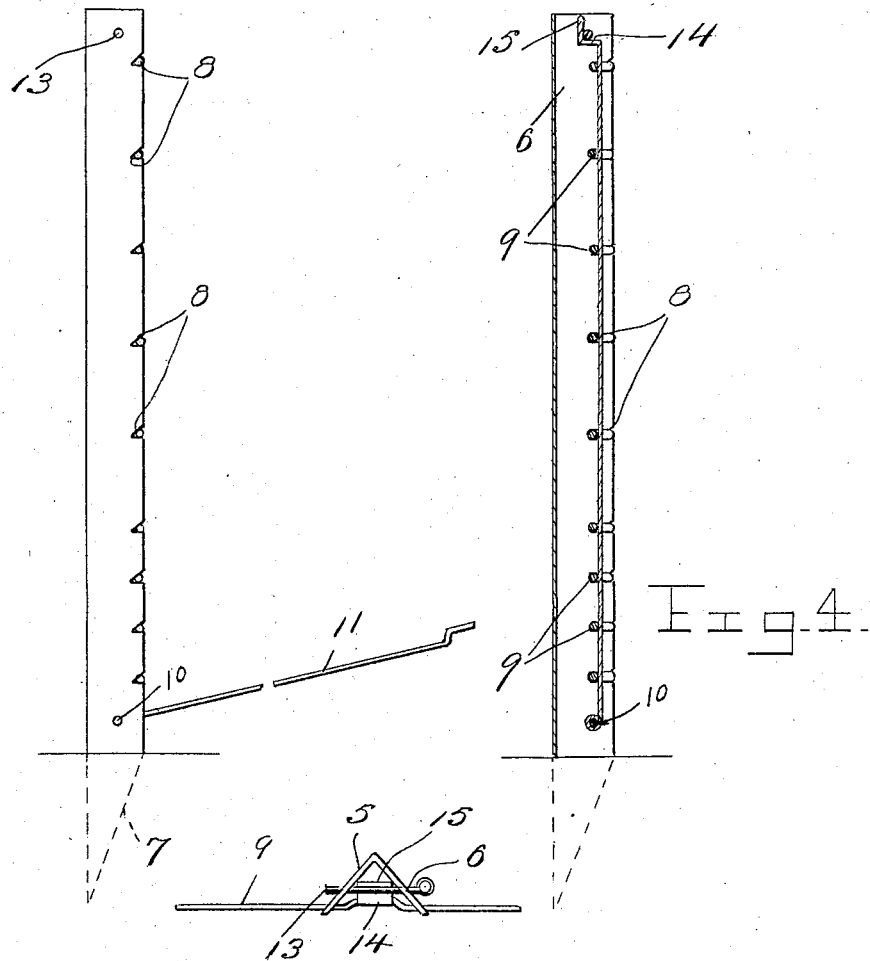

UNITED STATES PATENT OFFICE.

FRANK M. GARRY, OF BERGEN, NEW YORK.

FENCE-POST.

No. 823,722.      Specification of Letters Patent.      Patented June 19, 1906.

Application filed April 4, 1905. Serial No. 253,864.

*To all whom it may concern:*

Be it known that I, FRANK M. GARRY, a citizen of the United States, residing at Bergen, in the county of Genesee, State of New York, have invented certain new and useful Improvements in Fence-Posts; and I do hereby declare the following to be a full, clear, and exact description of the invention, such as will enable others skilled in the art to which it appertains to make and use the same.

This invention relates to fence-posts, and more particularly to metallic fence-posts, and has for its object to provide a device of this nature which will be so arranged that wires may be quickly and securely attached thereto, a further object being to provide a post so constructed that a plurality of wires may be simultaneously attached thereto or detached therefrom, it being thus possible to use the post in connection with woven-wire fencing.

Other objects and advantages will be apparent from the following description, and it will be understood that modifications of the specific construction shown may be made and any suitable materials may be used without departing from the spirit of the invention.

In the drawings forming a portion of this specification, and in which like numerals of reference indicate similar parts in the several views, Figure 1 is a view showing a plurality of posts constructed in accordance with the present invention and having a plurality of wires engaged therewith to form a fence. Fig. 2 is a side elevation of the post, showing the retaining-bar lowered to permit of disengagement of the wires. Fig. 3 is a top plan view. Fig. 4 is a section on line 4 4 of one of the posts shown in Fig. 1.

Referring now to the drawings, the present post is formed of a suitable metallic plate bent upon its central longitudinal axis to form side portions 5 and 6, which extend at an acute angle to each other, the lower corners of these side portions being cut away to present a sharpened lower end 7, which facilitates the planting of the post in the ground. The side portions 5 and 6 are each provided with a plurality of vertically-spaced notches 8 in their free edges, the notches of the two side portions registering in pairs for the reception of strand-wires 9 of a fence. These series of notches terminate short of the lower end of the post, the unnotched portion being designed to be planted in the ground, and at the lower ends of these series the distance between the notches is somewhat less than that between the notches at the upper ends of the series, it being thus possible to place the strand-wires which lie adjacent to the ground closer together to prevent the passage of small animals and fowls through the fence.

Below the lowermost notches 8 the side portions 5 and 6 are provided with registering perforations 5' and 6', respectively, in which there is engaged a transversely-extending pin 10, and above the uppermost notches the side portions are provided with registering perforations 5ᵃ and 6ᵃ, which are similar to the first-mentioned perforations.

A retaining-bar 11 is provided, which is bent to form a loop 12 at its lower end, and this member is disposed with its loop pivotally engaged with the pin 10 to permit of movement of the upper end of the bar toward and away from the post. A pin 13 is removable engaged in the perforations 5ᵃ and 6ᵃ, and the upper portion of the bar 11 is turned inwardly, as shown at 14, and then upwardly, as shown at 15, the last-named portion being adapted for engagement behind the pin 13 to hold the bar against movement upon the pin 10. When the bar is thus engaged, it lies between the side portions 5 and 6 and rests against the strand-wires 9, which are engaged in the notches 8 to prevent disengagement of the wires from the notches. It will thus be apparent that a plurality of wires may be secured to the post simultaneously, it being only necessary to move the bar 11 outwardly and downwardly out of its normal position and engage the wires in the notches, after which the bar is moved again into its normal position, and the pin 13 is engaged therewith to hold it in such position. By reason of the fact that the wires of a fence may be simultaneously disengaged from a post the fence may be easily let down when snow has drifted thereagainst or at any other time when it may be desired to do so.

What is claimed is—

1. In a fence-post, the combination with spaced portions having notches therein registering in pairs and having registering perforations therein above and below the notches, of a pivot-pin engaged in the lowermost perforations, a member having its lower end bent to form a loop, said pin being engaged in the loop for pivotal movement of the member thereupon into and out of the space between the spaced portions, the registering notches being adapted for the reception of wires, the upper end of said member being bent inwardly and then upwardly, the upwardly-bent portion lying at the opposite side of the uppermost perforations from the notched edges of the spaced portions, and a pin removably engaged in the uppermost perforations in engagement with the upwardly-bent portion of the member to hold the latter against outward pivotal movement, said member when between the spaced portions being adapted for engagement of wire disposed in the notches to hold them in such position.

2. A fence-post comprising a metallic plate bent longitudinally to form portions extending at an angle to each other, said portions having pairs of registering notches in their free edges and having pairs of registering perforations adjacent to their ends, a pivot-pin engaged in the lower pair of perforations, a retaining-bar bent at its lower end to form an offset loop encircling the pivot-pin, and a pin removably engaged in the upper perforations, said retaining-bar being bent inwardly and then upwardly at its upper end and lying with its upwardly-bent portion inwardly of the removable pin to prevent outward movement of the retaining-bar, said bar when in engagement with the removable pin lying in position for engagement of wires disposed in the notches to prevent removal thereof.

In testimony whereof I affix my signature in presence of two witnesses.

FRANK M. GARRY.

Witnesses:
GEO. D. WIEDRICH,
GEO. SANDS.